Aug. 30, 1927.

B. C. STICKNEY 1,641,105

GAS ENGINE

Filed Dec. 27, 1924     4 Sheets-Sheet 1

INVENTOR

Burnham C Stickney

Aug. 30, 1927.  1,641,105
B. C. STICKNEY
GAS ENGINE
Filed Dec. 27, 1924  4 Sheets-Sheet 3

INVENTOR
Burnham C Stickney

Aug. 30, 1927.  
B. C. STICKNEY  
GAS ENGINE  
Filed Dec. 27, 1924  
1,641,105  
4 Sheets-Sheet 4

INVENTOR  
Burnham C Stickney

Patented Aug. 30, 1927.

1,641,105

UNITED STATES PATENT OFFICE.

BURNHAM C. STICKNEY, OF RUTHERFORD, NEW JERSEY.

GAS ENGINE.

Application filed December 27, 1924. Serial No. 758,344.

This invention relates to rotary valves for internal combustion and other engines.

The valve is preferably in the form of a cylindrical hollow-walled revolving ported shell. Its porting may include exhaust ports constituting orifices on opposite sides, each extending entirely through the wall of the shell, and may also include an intake port which is in a different zone from the exhaust ports and which admits mixed air and fuel into the chamber or hollow within the valve. Said valve porting may also include inlet ports in the interior of the two valve walls, for admitting the charge to the engine cylinder. The charge circulates between the inner and outer walls of the valve and becomes heated, incidentally cooling the valve; the advantage being also gained of taking the charge into the chamber at one elevation or in one zone, and discharging it into the engine at another elevation or zone. A further advantage gained is that the valve ports, through which the charge passes into the engine, may be in the same zone as the exhaust ports, but spaced therefrom circumferentially of the valve, thereby utilizing the same valve-seat ports for both intake and exhaust.

The present invention secures the foregoing advantages and the further advantage that the valve may be revolved once for but two revolutions of the engine-crank-shaft, whereby sufficient speed of valve opening and closing is secured, since the speed of revolution is comparatively high. This result is gained in a novel organization wherein the pressure of gas is balanced upon the revolving valve, while the exhaust ports open only once in each revolution, the same being also true of the inlet ports. For pressure-balancing purposes the ports in the valve seat (which is in the nature of a stationary cylinder over which the valve telescopes or forms a sleeve) are placed upon opposite sides of the cylinder; yet the exhaust is opened only once in each revolution. The same is true of the inlet. To this end, the exhaust ports are set differently at opposite sides of the valve seat. In one form of the invention, one side of the valve seat has a full-sized port, while the other side thereof has two half-sized ports, and the latter are placed in different zones, or at different elevations, as compared with said full-sized port. With this arrangement corresponds the porting of the rotary valve, the same having at one side a full-sized exhaust port, and on the other side upper and lower half-sized exhaust ports. The half-sized or fractional ports are placed one above and one below the zone of the full-sized port. It results that at one point in the revolution of the valve, its exhaust ports all register with the respective ports of the internal valve seat, so that gases may be discharged from the engine. When, however, the valve makes a half revolution, none of its exhaust ports come into register with the ports in the valve seat, which therefore remain closed or out of use. But re-registration and co-operation of the valve occur at the completion of an entire revolution. Hence the exhaust ports are opened or used once in every two revolutions of the engine-crank-shaft. This secures quick opening and closing of the ports, and secures balancing of gas-pressure on the valve. The valve capacity on one side may be the same as that on the other side of the valve seat. The invention is not limited to the particular arrangement of fractional seat valve or chest ports illustrated.

Likewise the inlet ports in the inner of the two walls of the hollow valve are opposed, and comprise a large inlet port on one side and upper and lower half-sized inlet ports on the other side, to co-operate with the seat ports and the chest ports. These inlet ports follow the exhaust ports as said valve rotates, and the charge flows in through the same seat ports that are used for the exhaust. With a full-sized intake port on one side and upper and lower half-sized intake ports on the other side, intake communication with the engine cylinder is established only once in each revolution of the valve. It is believed to be novel to oppose ports in different zones for the double purpose of securing balanced gas-pressure and also causing the valve ports alternately to register and disaccord with the seat ports, preferably once in each revolution or in two revolutions of the crank shaft. A single one-piece hollow-walled valve constitutes the sole rotating part, and may be suitably driven by means of a simple train of gearing from the engine-crank-shaft.

Another feature of the invention relates to the valve seat, which is water-jacketed. Internal combustion engines usually comprise a series of engine cylinders and a detachable head. The improved rotary valves are placed in the detachable head. Each water-jacketed valve seat is within its valve and is in the form of a hollow-walled support preferably cylindrical to match the shape of the valve, which is also preferably cylindrical. The water circulates in the valve seat for shielding the valve from the heat of explosion, and also for the purpose of minimizing the temperature of the valve, and equalizing the temperature of seat and valve. The improved valve seats are made in separate units and secured to the engine head, and each valve seat before its attachment may be inexpensively ground to exact fit for the interior periphery of the valve, and may then be inserted in the engine head and fastened. The valve seat is preferably in the form of a hollow-walled cylinder having a central opening for a gas passage to and from the engine; with ports radiating from said opening to the exterior of the valve seat to correspond as aforesaid with the valve ports. Said seat is provided at its lower end with a head, which preferably fits a countersink in the plate forming the bottom or base of the valve chest; and each seat is drawn up into said countersink preferably by means of an overhead screw, which threads down into a hollow nipple or neck formed at the top of the valve seat; the head of the screw catching over a cap which rests upon the top or brim of the stationary ported chest within which the valve fits and revolves. By turning the screw down, the cap is forced down upon the brim of the chest, and the seat is therefore drawn upwardly into the countersink in the base of the engine head.

The row of chests may be cast in one piece with the detachable engine head; and the latter may be water-jacketed throughout its length, minimizing and equalizing the heat of the chests and valves. Cool water is supplied directly to the hollow walls of the several valve seats, the water passing up one side and down the other side of each seat, and thence escaping into the main water jacket or reservoir, which may have a top outlet to the usual radiator. Provision is made for water communication between each attached valve seat and the main water compartment of the engine head, and provision is also made for guarding against leakage of water into the engine cylinders.

Other features and advantages will hereinafter appear.

In the accompanying drawings.

The usual water-jacketed engine block 20 has a series of four or other number of cylinders 21 upon which is detachably secured, as by bolts 22, a head designated generally as 23, which may comprise a base or floor 24 fitting down upon the engine. From the base rise cylindrical valve chests 25, 26, 27 and 28. Within each chest there revolves about a vertical axis a valve, which may be an iron casting, and which is indicated generally as 29, and may comprise outer and inner cylindrical walls 30, 31; the former fitting closely within said chest, and the latter fitting closely upon a ported seat which is preferably cylindrical and which is designated generally as 32. The seat may comprise an outer wall 33 and an inner cylindrical wall 34, these walls being separated to form water compartments or spaces designated generally as 35.

Figure 1:
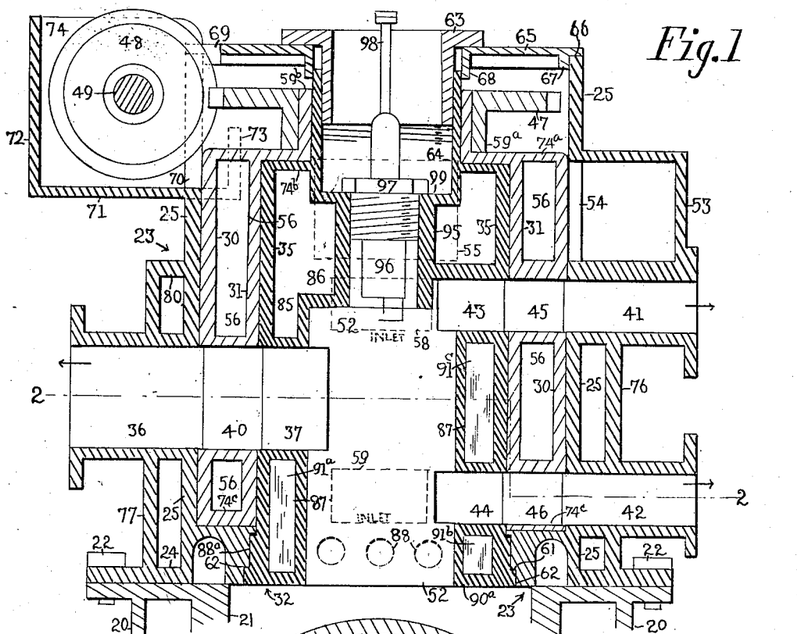
Figure 1 is a transverse sectional elevation, showing an engine cylinder and a detachable engine head provided with the present improvements, and showing the exhaust ports at full opening.
Figure 6:
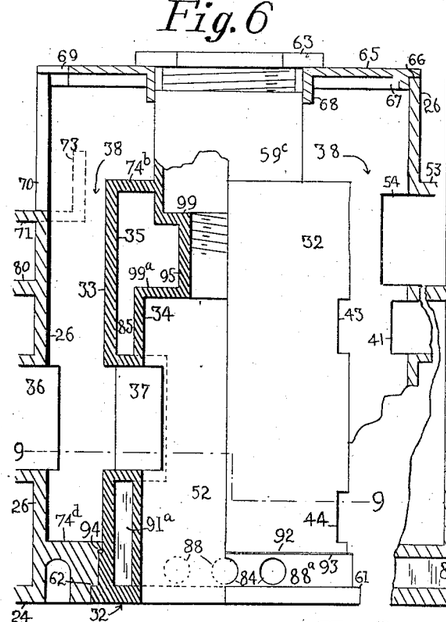
Figure 6 is a sectional view of the stationary chest and valve seat therein, but without the valve; the section being taken at about the same line as Figure 1, transversely of the engine head.
Figure 9:
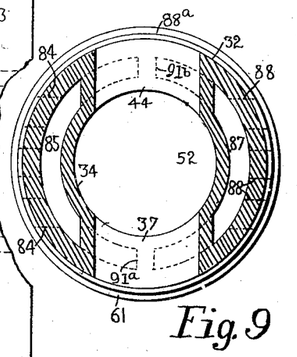
Figure 9 is a sectional plan of a detached chest, taken at about the line 9—9 of Figure 6, to show the porting at different elevations.
Figure 10:
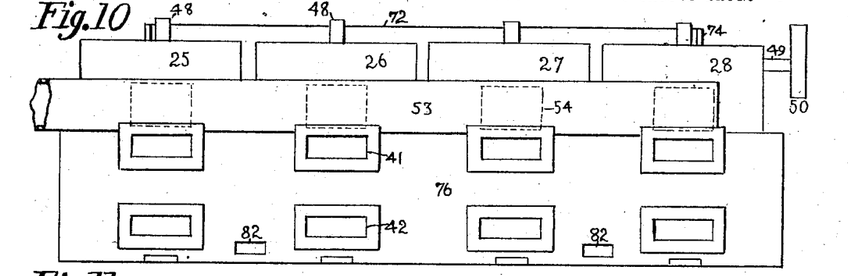
Figure 10 is a side elevation of the detachable engine head.
Figure 11:
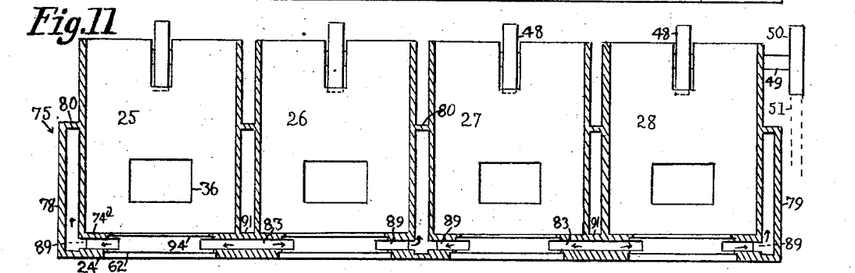
Figure 11 is a longitudinal sectional elevation and Figure 12 is a plan of the same.
Figure 12:
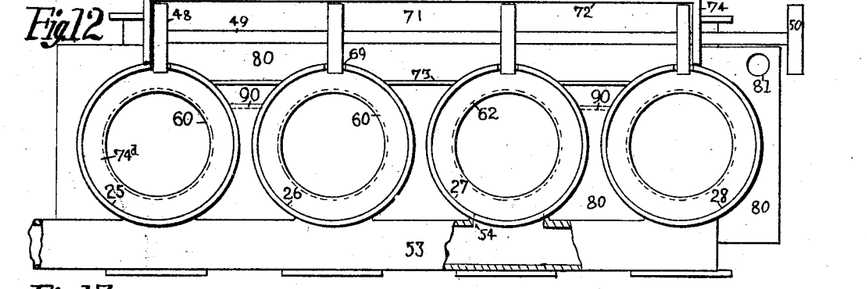

At Figures 1 and 6 the chest and seat are shown provided at the left with preferably full-sized exhaust ports 36 and 37, respectively; while the cylindrical valve 29, which rotates in an annular well 38 between the seat and chest, is provided on one side with a port 40 that passes entirely through the side of the valve and corresponds in dimensions and position with the ports 36, 37. Upon the right-hand side of Figures 1 and 6, the chest 25 is provided with upper and lower half ports 41, 42 for the exhaust, these being opposite to the port 36; while the seat is provided with half ports 43, 44 registering with 41 and 42, respectively, and corresponding with upper and lower half ports 45, 46 in the valve. Each half port has the same width as a full port, as seen in plan at Figures 2 and 9; while its vertical dimension is only half that of the full port. Since the half ports are opposed to the full ports, the gas-pressure upon the revolving valve, when the ports 37, 43, 44 are closed, is balanced; and to avoid liability of faulty distribution of pressure, the full port is preferably placed at an elevation midway between the half ports, as at Figure 1.

Figure 2:
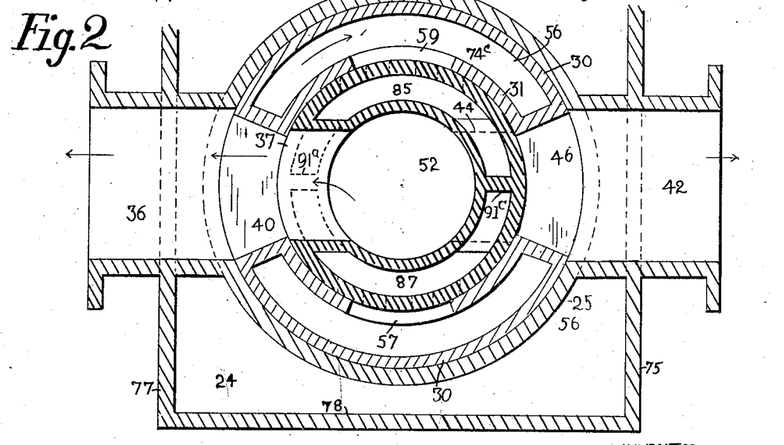
Figure 2 is a sectional plan taken at about the line 2—2 of Figure 1 in a manner to show the full-sized porting on the left-hand side and one of the half ports on the right-hand side, but at a lower elevation.

At Figures 1 and 2 are shown the exhaust ports fully open; but it will be understood that when the valve has completed a half of a revolution from the Figure 1 position, the valve port 40 will be at the right-hand side at Figure 1, and will be closed by middle portions of the chest and seat walls, while the valve ports 45 and 46 (which will then be on the left-hand side) will be closed by upper and lower portions of the chest and seat walls. Hence port 40 remains closed until it again reaches the ports 36, 37, while the ports 45 and 46 remain closed until they again reach the ports 43, 41, 44, 42. Hence there is an opening of the stationary exhaust ports only once in each revolution of the valve, which carries a driving gear 47 meshing with a worm 48, there being as many worms as there are valves, and the worms being carried upon a drive-shaft 49 having a sprocket-wheel 50 and a one-to-one chain connection 51 to the crank-shaft of the engine. Thus rapidity of opening and closing of the ports is secured by means of rapid revolution of the valve, whose ports open only once in each revolution, notwithstanding that the seat ports are placed on opposite sides for pressure-balancing. The problem of balancing the pressure by means of opposing ports and at the same time securing rapid action, is solved by opening the opposed ports only once in each revolution of the valve, this being accomplished by dividing one of the opposing ports into fractions and placing the fractions above and below the opposite port. In this way the revolving valve ports match the stationary ports only once in each revolution. Each valve port first opens a seat port at one side, and then skips or passes by the seat port at the opposite side. Valve port 40 co-operates with stationary ports 36 and 37 at one side of the device, but not with ports 41—44 at the opposite side. Valve ports 45, 46 co-operate with 41—44, but not with 36, 37.

The advantage is also present of using small ports, permitting the use of small diameters of the seat and chest, with corresponding reduction of cost in manufacture and ease of operation and reduction of wear. The internal diameter of the cylindrical main gas passage or explosion chamber 52 in the seat may be no greater than the opening of the exhaust port provided for an ordinary poppet valve.

The intake manifold 53 is preferably integral with the cast-iron detachable engine head, and at each chest has an inlet port 54, these ports being all above the region or level of the exhaust ports. Likewise above its exhaust ports, the rotary valve has a single inlet port 55 in its outer wall only, which comes into register with the port 54 only once in each revolution of the valve, and admits mixed air and fuel into the annular chamber 56 of the hollow-walled valve, where, by cooling the valve, it becomes heated on its way to the engine cylinder. This is the only inlet port in the outer wall of the valve, and may be of somewhat less area or capacity than the gas passage 52. The inner wall 31 of the valve has on one side a full-sized inlet port 57, following the exhaust port 40 as the valve turns to the right, and has upon the opposite side upper and lower inlet half ports 58, 59 in the same zones with the exhaust half ports 45, 46 and directly following the same. The hub $59^a$ of the gear is fastened upon a hub portion $59^b$ of the valve. Thus the bearing of the valve is of relatively small diameter at the point of application of power thereto; said hub $59^b$ having a bearing upon a neck or boss $59^c$ at the top of the seat 32.

In the drawings the inlet ports begin to open as soon as the exhaust ports close, and the valve ports are shown as of equal extent in plan, each being diagrammatically shown as extending 45 degrees; but it will be understood that the timing may be modified according to any desired practice, without departing from the invention, as by enlarging the exhaust ports and diminishing the inlet ports and by providing for lead and lag. It will be understood that when the valve is advanced a quarter of a revolution from the position at Figure 2, its exhaust ports 40, 46 will be closed, the same being then confined between the unported portions of the seat and chest; while the inlet port 57 will be in register with the full-sized port 37 in the seat, and in communication with the engine cylinder during the down or intake stroke of the engine piston; and at this time the port 36 in the chest will be closed by the outer wall 30 of the hollow wall valve, said outer wall 30 having no outlet from the internal gas passage or explosion chamber 56. At the same time the upper and lower fractional ports 41, 42 in the chest are closed by said outer hollow wall 30 of the valve. At this time the uppermost intake ports 54, 55 are open, through which the engine piston draws a fresh charge into the annular chamber 56, while drawing the previously heated charge out of said chamber through the half ports 58, 59 in the inner walls thereof, and through the central passage 52 into the engine cylinder.

It will be seen that the arrangement of the full intake port 57 and the upper and lower half intake ports 58, 59 is adapted to match the arrangement of the seat ports 37, 43 and 44, respectively, whereby the valve intake ports are open only once in each revolution thereof, in a manner that will be understood from the foregoing explanation of the opening of the valve exhaust ports 45, 46 only once in each revolution thereof. There is alternation of opening and skipping of the seat ports by the valve ports, so that the opening of any port occurs only once in a revolution, notwithstanding the fact that the seat is ported on both sides. Hence at each revolution of the valve there is first exhaust of the used charge from the engine, and then inlet of a heated fresh charge from the annular chamber or reservoir 56 during the opening of the inlet ports at a quarter of a revolution of the valve, and then compression with all ports closed during the next quarter revolution of the valve, and finally explosion with all ports closed during the final quarter of the revolution of the valve, completing the cycle.

An advantage of certain of the present improvements arises from making and grinding each seat separately from the engine head and securing and packing the same therein, while providing for exactness of location thereof and close fit and easy operation of the valve thereon in the annular space or well between the seat and the chest. The base of the engine head is provided with a series of circular openings 60, each of which fits tightly around the cylindrical seat, the latter being preferably a steel casting and being thrust up through said opening. On its bottom the seat has a head, shoulder or step 61, which fits tightly into a countersink 62 formed in the bottom of the engine head. The cylindrical seat is drawn up into said countersink by means of a hollow bolt-headed top nut 63, which is threaded down into a hollow integral nipple or neck 64 rising from the top of the seat. The head of the bolt 63 presses down upon an annular cap 65. These caps rest upon the brims 66 of the cylindrical chests 25, 26, 27 and 28. It will be seen that by turning the screw down into the threaded neck 64, each seat may be drawn up tightly into the countersink or recess 62, thus making a water-tight joint. The inside of the chest 25 is readily and cheaply ground to fit the ground exterior of the valve; and the cap 65 has a downwardly-projecting annular flange 67, which fits within the chest 25; and also has a central downwardly-extending flange 68, which fits tightly upon the exterior of the neck 64, whereby the cylindrical seat is accurately located centrally within the valve chest 25, and an accurate and easy fit is assured of the exteriorly and interiorly ground valve to both the valve seat and the chest, at relatively low expense, while parts are of simple construction and easy to assemble and not likely to get out of order.

The caps may be provided with clearance slots 69 for the worm-wheels 48; and the chest may also be provided with clearance slots 70. The worms may be confined within an oil-pan comprising a bottom 71, an outer side 72, an inner side 73 and ends 74; the oil working from the pan down between the valve and the chest and under the bottom of the valve, and up between the valve and the seat, by the aid of channels (not shown) in the stationary members.

The top 74ª of the valve rests or fits upon the top 74ᵇ of the seat; and the closed bottom 74ᶜ of the valve fits or rests upon the annular bottom 74ᵈ of the chest.

Figure 7:
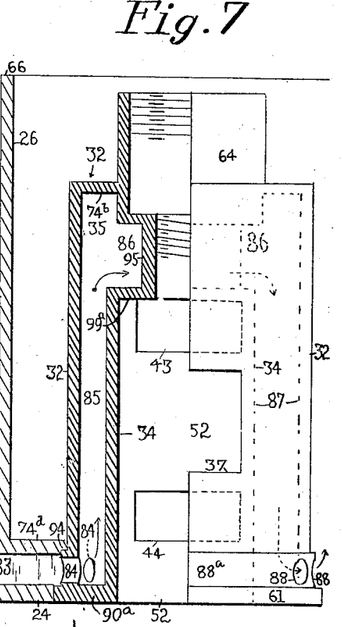
Figure 7 is another sectional view of the chest and valve seat, the section being on a line at right angles to that at Figure 6, or longitudinally of the engine head; this valve illustrating the coursing of the water through the water-jacket in the seat.
Figure 8:
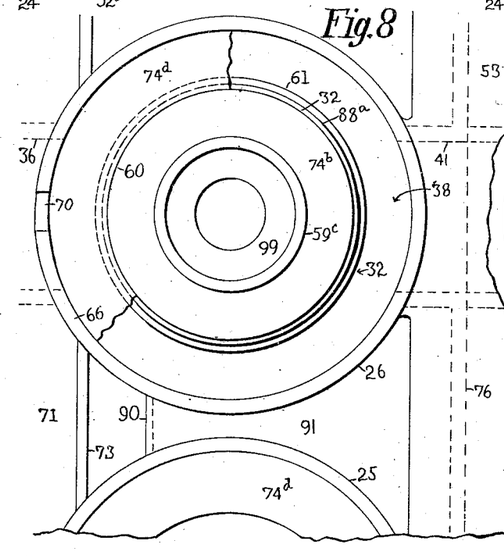
Figure 8 is a plan of a portion of the engine head, showing the chests integral therewith and one of the seats inserted within its chest.
Figure 13:
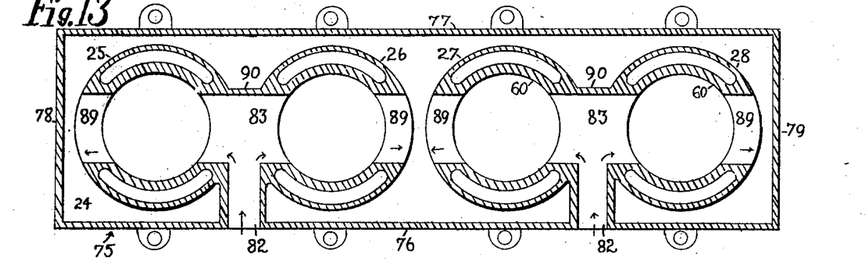
Figure 13 is a sectional plan of the lower portion of the engine head.

The engine head may be provided with a water-jacket indicated generally as 75, and comprising walls 76, 77 and end walls 78, 79, forming a box enclosing the lower portions of the chests and integral therewith, the floor or plate 24 forming the bottom of the water-jacket or tank, and the same being closed by a top 80, having an outlet 81; the cylindrical chests extending up beyond said top 80, and the intake manifold 53 also preferably overlying said top. Cool water may be introduced through like inlets 82, one for each pair of valve chests, see Figure 13. The channel or passage 82 opens into a waterpassage 83, delivering the water to adjacent chests, one of which is seen at Figure 7; the water entering each chest through perforations 84 and flowing up in a segmental passage 85 between the inner and outer walls 34 and 33 of the chest, and thence flowing across the chest through an annular passage 86, and thence down through an opposite segmental passage 87 and out through outlets 88 into the general reservoir 75, the heated water rising to its outlet 81. There may be an inlet 82 with a passage 83 for each pair of chests. On the opposite side of each chest is a passage 89 through which the water escapes from the outlets 88 in the chests. The perforations 84 and 88 are formed in a shoulder portion 88ª of the base of the seat 32. Each passage 83 is enclosed by a wall 90 connecting the chests and a top 91 extending between the chests. The segmental passages 85, 87 are separated by a vertical partition 91ª rising from the bottom 90ª to the port 37 on one side of the seat, and vertical partitions 91ᵇ and 91ᶜ on the other side thereof, so that water cannot flow across the seat except at the upper portion thereof. Partition 91ᵇ extends from the bottom up to port 44, and 91ᶜ extends from the top of 44 up to port 43.

To prevent leakage of water upwardly around the valve seat, there may be employed a packing ring 92, placed upon the edge 93 of shoulder 88ª and a step or countersink 94 formed in the bottom of the engine head. The height of said shoulder 88ª may be sufficient to accommodate the water inlet and outlet perforations 84, 88. The annular water chamber 86 may surround a cylindrical integral housing 95 for a spark-plug 96, said housing opening at its bottom into the explosion chamber 52 and being closed at its top by the head 97 of the spark-plug, the latter being inserted down through the hollow tie-bolt or screw 63, and preferably having a stem 98 extending above the screw 63 for convenience in attaching a leading wire thereto; the head 97 of the spark-plug bearing down upon the bottom or floor 99 of the neck 64. Said housing 95 may extend up from the top 99ª of the explosion chamber 52.

Figure 3:
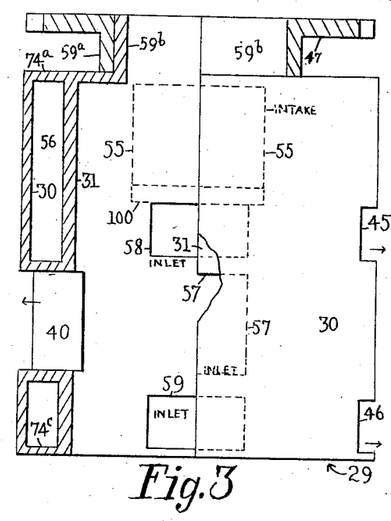
Figure 3 is a sectional elevation showing the rotating valve separated, but in the same position as at Figure 1; the direction of the sectioning being transversely of the engine head, as at Figure 1.
Figure 4:
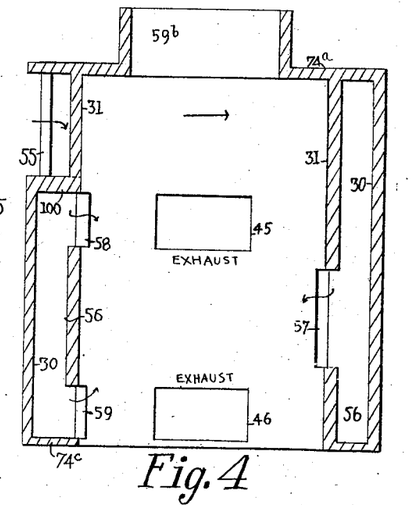
Figure 4 is a sectional view of the valve, the direction of the sectioning being longitudinally of the engine head.
Figure 5:
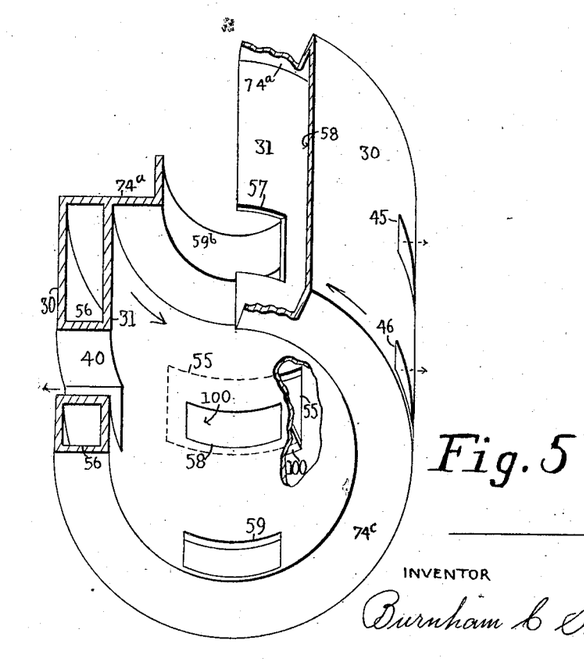
Figure 5 is a sectional diagrammatic perspective of the valve.

Below the intake 55 is preferably placed a baffle 100 in the nature of a step or plate extending horizontally to the top of the inlet port 58, see Figures 3 and 5, to increase the circulation of the charge in the chamber, so that such gas as passes in through the port 58 will be warmer than if passing directly from 55 through 58 into explosion chamber 52.

Variations may be resorted to within the scope of the invention, and portions of the improvements may be used without others.

Having thus described my invention, I claim:

1. An engine valve in the form of a hollow-walled revolving ported shell, its porting including opposed exhaust orifices, each extending entirely through the hollow wall, and also including an intake port in a different zone from the exhaust ports to supply fluid fuel to the space within the hollow wall, said porting also including inlet ports in the interior wall and communicating with the engine cylinder.

2. A rotary valve having exhaust ports in one zone and having an inlet port in another zone, said inlet port opening into the engine cylinder in the same zone as the exhaust ports, and means for revolving said valve, each of the exhaust and inlet ports opening only once in each revolution.

3. A rotary valve having exhaust ports in one zone and having an inlet port in another zone, said inlet port opening into the engine cylinder in the same zone as the exhaust ports, means for revolving said valve once for two revolutions of the engine-crank-shaft, each of the exhaust and inlet ports opening only once in each revolution, and a seat for said valve, said seat having pressure-balanced opposing ports, and the ports in said valve having a corresponding arrangement.

4. A rotary valve having exhaust ports in one zone and having an inlet port in another zone, said inlet port opening into the engine cylinder in the same zone as the exhaust ports, means for revolving said valve once for two revolutions of the engine-crank-shaft, each of the exhaust and inlet ports opening only once in each revolution, and a seat for said valve, the ports in said seat being diametrically opposed, and comprising a full exhaust port on one side of the seat and half-sized exhaust ports on the opposite side of the seat, one above and the other below the full exhaust port, and the ports in said valve having a corresponding arrangement.

5. A rotary valve having exhaust ports in one zone and having an inlet port in another zone, said inlet port opening into the engine cylinder in the same zone as the exhaust ports, means for revolving said valve once for two revolutions of the engine-crank-shaft, each of the exhaust and inlet ports opening only once in each revolution, a seat for said valve, the ports in said seat being diametrically opposed, and comprising a full exhaust port on one side of the seat and half-sized exhaust ports on the opposite side of the seat, one above and the other below the full exhaust port, and the ports in said valve having a corresponding arrangement, and a chest within which said valve rotates, said chest having corresponding opposed ports, so that the exhaust ports are open only once in each revolution of the valve.

6. The combination of a rotary valve having opposed ports, means for revolving said valve once for two revolutions of the engine-crank-shaft, said ports including fractional ports in different zones, and an internal stationary valve seat having ports in its opposite sides with a corresponding arrangement, whereby pressure is balanced upon the valve and the exhaust ports are open only once in each revolution.

7. The combination of a rotary valve having opposed ports, means for revolving said valve once for two revolutions of the engine-crank-shaft, said ports including fractional ports in different zones, an internal stationary valve seat having ports in its opposite sides with a corresponding arrangement, whereby pressure is balanced upon the valve and the exhaust ports are open only once in each revolution, and a chest within which said valve rotates, said chest having corresponding opposed ports.

8. A rotary valve having exhaust ports in one zone and having an inlet port in another zone, said inlet port opening into the engine cylinder in the same zone as the exhaust ports, means for revolving said valve once for two revolutions of the engine-crank-shaft, each of the exhaust and inlet ports opening only once in each revolution, and a seat for said valve, the ports in said seat being diametrically opposed, and comprising a full exhaust port on one side of the seat and half-sized exhaust ports on the opposite side of the seat, one above and the other below the full exhaust port, and the ports in said valve having a corresponding arrangement, the valve also having opposed full-sized and half-sized inlet ports correspondingly placed and co-operating with said ports in said seat at alternate revolutions of the valve.

9. A rotary valve having exhaust ports in one zone and having an inlet port in another zone, said inlet port opening into the engine cylinder in the same zone as the exhaust ports, means for revolving said valve once for two revolutions of the engine-crank-shaft, each of the exhaust and inlet ports opening only once in each revolution, and a seat for said valve, the ports in said seat being diametrically opposed, and comprising a full exhaust port on one side of the seat and half-sized exhaust ports on the opposite side of the seat, one above and the other below the full exhaust port, and the ports in said valve having a corresponding arrangement, the valve also having opposed full-sized and half-sized inlet ports correspondingly placed and co-operating with said ports in said seat at alternate revolutions of the valve, said valve being hollow-walled and said inlet ports being in the interior wall only, and said valve having an intake port on its outer side above the ports in the seat and communicating with said interior inlet ports.

10. The combination with a seat having opposing sectional ports in different zones on the opposite sides of the seat, of a valve fitted to said seat, and means to rotate the valve, said valve having corresponding exhaust ports alternately matching and skipping the seat ports.

11. The combination with a seat having opposing sectional ports in different zones on the opposite sides of the seat, of a valve fitted to said seat, said valve having corresponding exhaust ports alternately matching and skipping the seat ports, and also having correspondingly placed inlet ports alternately matching and skipping the same seat ports, and means for rotating the valve.

12. A rotatable valve having unmatched opposing ports in combination with a seat having correspondingly unmatched opposing ports balancing the pressure upon the valve, the valve ports alternately matching and unmatching the seat ports, and a chest within which the valve is fitted, said chest ported correspondingly with the seat.

13. A rotatable valve having unmatched opposing ports in combination with a seat having correspondingly unmatched opposing ports balancing the pressure upon the valve, the valve ports alternately matching and unmatching the seat ports, and a chest within which the valve is fitted, said chest ported correspondingly with the seat, said valve being hollow and having an exterior intake port in a different zone from the seat ports.

14. The combination with a chest having at different elevations an inlet port and an exhaust port, of a valve fitted in said chest and having corresponding intake and exhaust ports, and a seat over which said valve fits, said seat having a combination exhaust and inlet port, and said valve having an inlet port to co-operate with the port in said seat and communicating with the exterior intake port in said valve.

15. An engine having a seat, a chest surrounding the seat, a sleeve-valve or shell between the seat and the chest, and means to rotate the valve, said seat having opposing ports, each of said ports for both inlet and exhaust, said valve having opposing exhaust ports, said chest having ports corresponding to those in the seat, the opposing ports in the seat balancing the gas pressure upon the valve, but comprising a series of fractional-sized or sectional ports, the porting being at different elevations on opposite sides of the valve and on opposite sides of the seat, and the porting in the valve and chest having a corresponding arrangement whereby alternate opening and skipping of the seat ports is secured.

16. An engine having a seat, a chest surrounding the seat, a sleeve-valve or shell between the seat and the chest, and means to rotate the valve, said seat having opposing ports, each of said ports for both inlet and exhaust, said valve having opposing exhaust ports, said chest having ports corresponding to those in the seat, the opposing ports in the seat balancing the gas pressure upon the valve, but comprising a series of fractional-sized or sectional ports, the porting being at different elevations on opposite sides of the valve and on opposite sides of the seat, and the porting in the valve and chest having a corresponding arrangement whereby alternate opening and skipping of the seat ports is secured, and said valve having a corresponding set of inlet ports to co-operate with said seat ports in a like manner.

17. An engine having a seat, a chest surrounding the seat, a sleeve-valve or shell between the seat and the chest, and means to rotate the valve, said seat having opposing ports, each of said ports for both inlet and exhaust, said valve having opposing exhaust ports, said chest having ports corresponding to those in the seat, the opposing ports in the seat balancing the gas pressure upon the valve, but comprising a series of fractional-sized or sectional ports, the porting being at different elevations on opposite sides of the valve and on opposite sides of the seat, and the porting in the valve and chest having a corresponding arrangement whereby alternate opening and skipping of the seat ports is secured, said valve having a corresponding set of inlet ports to cooperate with said seat ports in a like manner, and said valve also having an exterior intake port in a different zone from the seat ports, but communicating with the interior inlet ports.

18. An engine comprising a seat, a chest and a one-piece rotary valve fitted between the seat and the chest, the seat having opposed ports common to the exhaust and inlet, the chest having corresponding ports, the valve having exhaust and inlet ports opening into said seat ports, the seat ports being opposed and securing pressure-balance upon the valve, and comprising fractional ports, the ports at one side of the seat being at different elevations from that at the other side, and the porting in the valve and the chest corresponding, the valve alternately opening and skipping the ports in the seat and chest.

19. An engine comprising a seat, a chest and a one-piece rotary valve fitted between the seat and the chest, the seat having opposed ports common to the exhaust and inlet, the chest having corresponding ports, the valve having exhaust and inlet ports opening into said seat ports, the seat ports being opposed and securing pressure-balance upon the valve, and comprising fractional ports, the porting at one side of the seat being at different elevations from that at the other side, and the porting in the valve and the chest corresponding, the valve alternately opening and skipping the ports in the seat and chest, and having correspondingly placed inlet ports to cooperate with the same ports in the seat, and the chest having at a different elevation an intake port, and the valve having an exterior intake port to correspond; said valve intake port communicating with said interior inlet ports.

20. An engine provided with an attached valve seat and an integral valve chest surrounding the seat, said seat having a head and said engine having a bottom provided with an opening in which the valve seat is fitted, means for fastening the head of said seat up against said bottom, said fastening means comprising a cap for the upper end of said chest, and a nut or bolt threaded into said valve seat to draw it upwardly, said nut having a head bearing down upon said cap.

21. An engine provided with an attached valve seat and an integral valve chest surrounding the seat, said seat having a head and said engine having a bottom provided with an opening in which the valve seat is fitted, means for fastening the head of said seat up against said bottom, said fastening means comprising a cap for the upper end of said chest, and a nut or bolt threaded into said valve seat to draw it upwardly, said nut having a head bearing down upon said cap, and said cap having a periphery fitting a periphery of the chest, and another periphery fitting a periphery of the valve seat to locate the latter.

22. An engine provided with an attached valve seat and an integral valve chest surrounding the seat, said seat having a head and said engine having a bottom provided with an opening in which the valve seat is fitted, means for fastening the head of said seat up against said bottom, said fastening means comprising a cap for the upper end of said chest, and a nut or bolt threaded into said valve seat to draw it upwardly, said nut having a head bearing down upon said cap, the valve having a gear above said chest and below said cap, and means extending within the chest to operate the gear.

23. An engine provided with an attached valve seat and an integral valve chest surrounding the seat, said seat having a head and said engine having a bottom provided with an opening in which the valve seat is fitted, means for fastening the head of said seat up against said bottom, said fastening means comprising a cap for the upper end of said chest, and a nut or bolt threaded into said valve seat to draw it upwardly, said nut having a head bearing down upon said cap, said valve seat having a hollow wall forming a chamber for cooling fluid, and means to circulate the fluid through said chamber.

24. An engine provided with an attached valve seat and an integral valve chest surrounding the seat, said seat having a head and said engine provided with a bottom having an opening in which the valve seat is fitted, and means for fastening the head of said seat up against said bottom, said valve seat having a hollow wall forming a chamber for cooling fluid, and means to circulate the fluid up and down through said chamber, said engine having a water compartment and said seat having ports opening into said water compartment, said ports being on opposite sides of the seat, and the ports on one side communicating through the sides and upper portion of the valve seat with the ports on the other side, said valve seat in the form of a hollow-walled cylinder having a central gas passage and gas ports radiating therefrom, and including fractional-sized ports, partitions being provided at said ports between the sides of the valve seat, and forming a cooling-fluid course up one side and down the other side of the valve seat.

25. An engine provided with an attached valve seat and an integral valve chest surrounding the seat, said seat having a head and said engine provided with a bottom having an opening in which the valve seat is fitted, means for fastening the head of said seat up against said bottom, said fastening means comprising a cap for the upper end of said chest, a nut or bolt threaded into said valve seat to draw it upwardly, said nut having a head bearing down upon said cap, said nut or bolt being hollow, and a spark-plug within said nut and secured to the top of the valve seat and extending down thereinto.

26. An engine-head provided with an attached valve seat and an integral valve chest surrounding the seat, said seat having a head and said engine-head provided with a bottom having an opening in which the valve seat is fitted, means for fastening the head of said seat up against said bottom, said fastening means comprising a cap for the upper end of said chest, and a nut or bolt, said nut having a head bearing down upon said cap, said valve seat having a neck into which said nut or screw is threaded.

27. An engine provided with an attached valve seat and an integral valve chest surrounding the seat, said seat having a head and said engine provided with a bottom having an opening in which the valve seat is fitted, means for fastening the head of said seat up against said bottom, said fastening means comprising a cap for the upper end of said chest, and a nut or bolt, said nut having a head bearing down upon said cap, said valve seat having a neck into which said nut or screw is threaded, said neck serving as a bearing for the valve revolving around said seat.

28. An engine provided with an attached valve seat and a valve chest surrounding the seat, said seat having a head and said engine provided with a bottom having an opening in which the valve seat is fitted, and means for fastening the head of said seat up against said bottom, said valve seat having a hollow wall forming a chamber for cooling fluid, and means to circulate the fluid up and down through said chamber, said engine having a water compartment and said seat having water-port opening into said water compartment, said water-port being on opposite sides of the seat, and the water-port on one side communicating through the sides and upper portion of the valve seat with the water-port on the other side, means being provided in the engine for supplying water through one set of water-port and for conducting water away from the other set of water-port.

29. An engine-head provided with an attached valve seat and an integral valve chest surrounding the seat, said seat having a head and said engine-head having an opening in its bottom in which the valve seat is fitted, and means for fastening the head of said seat up against said bottom, said valve seat having a hollow wall forming a chamber for cooling fluid, and means to circulate the fluid through said chamber, said engine-head having a water compartment and said seat having ports opening into said water compartment, said ports being on opposite sides of the seat, and the ports on one side communicating through the sides and upper portion of the valve seat with the ports on the other side, means being provided in the engine-head for supplying water through one set of ports and for conducting water away from the other set of ports, comprising inlets, each communicating with adjacent valve seats; the outlets of said valve seats opening into the main water jacket or reservoir.

30. The combination with an engine having a series of valve chests, of attached valve seats extending within said chests, means for securing the seats and for locating them accurately relatively to the chests, valves revolving between the seats and the chests, and means for revolving the valves, each valve comprising outer and inner cylindrical walls fitting closely within the chests and upon the seat, said seat of cylindrical form and comprising outer and inner walls forming a water-course, each chest and seat provided on one side with a full-sized exhaust port, respectively, and upon the other side with upper and lower half ports for exhaust to balance the pressure, said half ports being, respectively, above and below the full-sized port, said valve having corresponding exhaust ports, said ports opening only once in each revolution of the valve.

31. The combination with an engine having a series of valve chests, of attached valve seats extending within said chests, means for securing the seats and for locating them accurately relatively to the chests, valves revolving between the seats and the chests, and means for revolving the valves, each valve comprising outer and inner cylindrical walls fitting closely within the chests and upon the seat, said seat of cylindrical form and comprising outer and inner walls forming a water-course, each chest and seat provided on one side with a full-sized exhaust port, respectively, and upon the other side with upper and lower half ports for exhaust to balance the pressure, said half ports being, respectively, above and below the full-sized port, said valve having corresponding exhaust ports, said ports opening only once in each revolution of the valve, said valve having opposite inlet ports to co-operate in like manner with said seat ports.

32. The combination with an engine having a series of valve chests, of attached valve seats extending within said chests, means for securing the seats and for locating them accurately relatively to the chests, valves revolving between the seats and the chests, means for revolving the valves, each valve comprising outer and inner cylindrical walls fitting closely within the chests and upon the seat, said seat of cylindrical form and comprising outer and inner walls forming a water-course, each chest and seat provided on one side with a full-sized exhaust port, respectively, and upon the other side with upper and lower half ports for exhaust to balance the pressure, said half ports being, respectively, above and below the full-sized port, said valve having corresponding exhaust ports, said ports opening only once in each revolution of the valve, said valve having opposite inlet ports to co-operate in like manner with said seat ports, and means to supply fluid charges to the inlet ports in said valve.

33. The combination with an engine having a series of valve chests, attached valve seats extending within said chests, means for securing the seats and for locating them accurately relatively to the chests, valves revolving between the seats and the chests, means for revolving the valves, each valve comprising outer and inner cylindrical walls fitting closely within the chests and upon the seat, said seat of cylindrical form and comprising outer and inner walls forming a water-course, each chest and seat provided on one side with a full-sized exhaust port, respectively, and upon the other side with upper and lower half ports for exhaust to balance the pressure, said half ports being, respectively, above and below the full-sized port, said valve having corresponding exhaust ports, said ports opening only once in each revolution of the valve, said valve having opposite inlet ports to co-operate in like manner with said seat ports, and means to supply fluid charges to the inlet ports in said valve, comprising an intake port in said chest at a different elevation from the ports in said seat, and also comprising an exterior port in the valve.

34. The combination with an engine having a series of valve chests, attached valve seats extending within said chests, means for securing the seats and for locating them accurately relatively to the chests, valves revolving between the seats and the chests, means for revolving the valves, each valve comprising outer and inner cylindrical walls fitting closely within the chests and upon the seat, said seat of cylindrical form and comprising outer and inner walls forming a water-course, each chest and seat provided on one side with a full-sized exhaust port, respectively, and upon the other side with upper and lower half ports for exhaust to balance the pressure, said half ports being, respectively, above and below the full-sized port, said valve having corresponding exhaust ports, said ports opening only once in each revolution of the valve, said valve having opposite inlet ports to co-operate in like manner with said seat ports, and means to supply fluid charges to the inlet ports in said valve, comprising an intake port in said chest at a different elevation from the ports in said seat, and also comprising an exterior port in the valve, said exterior intake port in communication with all of the interior inlet ports.

35. An engine having a base portion provided with a series of circular openings, cylindrical valve seats having bottom flanges or heads and fitted in said openings and extended up from said base, said seats having hollow necks at their upper ends and having hollow screws threaded down into said necks, valve chests extending up from said base and integral therewith, caps fitting upon said chests and supporting said nuts, whereby the seats are drawn up and secured to said base, means being provided for centering the upper ends of the seats within the chests, valves fitted between the seats and the chests, and valve-rotating means.

36. A detachable engine head having a base provided with a series of circular openings, cylindrical valve seats having bottom flanges or heads and fitted in said openings and extended up from said base, said seats having hollow necks at their upper ends and having hollow screws threaded down into said necks, valve chests extending up from said base and integral therewith, caps fitting upon said chests and supporting said nuts, whereby the seats are drawn up and secured to said base, means being provided for centering the upper ends of the seats within the chests, valves fitted between the seats and the chests, valve-rotating means, said nuts being hollow, and spark-plugs inserted in said necks and having communications extending up through said nuts.

37. An engine-head comprising a seat, a chest and a one-piece rotary valve fitted between the seat and the chest, the seat having opposed ports common to the exhaust and inlet, the chest having corresponding ports, the valve having exhaust and inlet ports opening into said seat ports, the seat ports being opposed and securing pressure-balance upon the valve, and comprising fractional ports, the porting at one side of the seat being at different elevations from that at the other side, and the porting in the valve and the chest corresponding, the valve alternately opening and skipping the ports in the seat and chest, and having correspondingly placed inlet ports to co-operate with the same ports in the seat, and the chest having at a different elevation an intake port, and the valve having an exterior intake port to correspond, said valve intake port communicating with said interior inlet ports, a baffle being provided below said exterior intake port in said hollow valve.

38. A detachable engine head casting including a main water compartment, a row of chests within said compartment, said head also including a compartment extending entirely across the casting at one end of the row of chests and serving as an intake manifold, said head also having a compartment forming a gear box, valves in said chests and extending into and through said manifold, and valve-driving gears in said gear box.

39. In a combustion engine, a valve block comprising a bottom, a series of valve seats inserted up through said bottom and rotary valves fitted upon said seats, each of said seats being butt-ended at its bottom to form a shoulder, and means for fastening the shoulders up against the bottom of the valve block.

40. In a combustion engine, a valve block comprising a bottom, a series of valve seats inserted up through said bottom and rotary valves fitted upon said seats, each of said seats being butt-ended at its bottom to form a shoulder, means for fastening the shoulders up against the bottom of the valve block, and chests enclosing said valves and extending up from the bottom of the block, said chests being exteriorly water-jacketed and said seats being interiorly water-jacketed, the bottom of said block having water-spaces in communication with said chests and said valve-jackets.

41. In a combustion engine, a valve block comprising a bottom, a series of valve seats inserted up through said bottom, and rotary valves fitted upon said seats, each of said seats being butt-ended at its bottom to form a shoulder, the base of the valve block being finished on its under side, and each seat with its shoulder being separately and detachably fastened up against said finished base.

42. In a combustion engine, a block having a row of engine cylinders and a row of valve chests adjacent to the cylinders, each chest having a bore, and valves revolving within said chests, said block having valve seats within said valves, each seat attached at its lower edge to the block.

43. In a combustion engine, a block having a row of engine cylinders and a row of valve chests adjacent to the cylinders, each chest having a bore, and valves revolving within said chests, said block having valve seats within said valves, each seat attached at its lower edge to the block, said block being generally water-jacketed around the engine cylinders and the valve chests, and the seats having water-passages communicating with said general water-jacketing, said water-passage extending from the bottom to the top of each valve seat.

BURNHAM C. STICKNEY.